United States Patent [19]

Hagman

[11] Patent Number: 5,404,984
[45] Date of Patent: Apr. 11, 1995

[54] MULTI-DIRECTIONAL ROLLER

[76] Inventor: Erland L. Hagman, One Austin Dr., New Fairfield, Conn. 06812

[21] Appl. No.: 275,506

[22] Filed: Jul. 15, 1994

[51] Int. Cl.$^6$ .......................................... B65G 13/00
[52] U.S. Cl. ........................... 193/35 MD; 193/37
[58] Field of Search ...................... 198/786, 787; 193/35 MD, 37

[56] References Cited

U.S. PATENT DOCUMENTS

| | | | |
|---|---|---|---|
| 3,363,735 | 1/1968 | Hotchkiss | 193/37 |
| 3,590,970 | 7/1971 | Kornylak | 193/37 |
| 3,621,961 | 11/1971 | Stumpf | 193/37 |
| 3,878,927 | 4/1975 | Murakami | 193/37 |
| 3,961,694 | 6/1976 | Murakami | 193/37 |
| 4,279,559 | 7/1981 | Stumpf | 193/37 X |
| 4,981,203 | 1/1991 | Kornylak | 193/35 MD |

FOREIGN PATENT DOCUMENTS

| | | | |
|---|---|---|---|
| 2624162 | 1/1977 | Germany | 193/37 |
| 2627014 | 12/1977 | Germany | 193/35 MD |
| 1535808 | 1/1990 | U.S.S.R. | 193/35 MD |

Primary Examiner—D. Glenn Dayoan
Attorney, Agent, or Firm—Edward R. Hyde

[57] ABSTRACT

A system of rollers that form a conveyor for parcels. The roller units are made up of segmented roller elements so that the parcels can be conveyed in any horizontal direction. Each roller unit has a plurality of spokes to maintain the segmented roller elements in position. A replaceable bearing unit permits the series of roller units to be accommodated on shafts of various configurations.

8 Claims, 2 Drawing Sheets

FIG. 4.
FIG. 5.
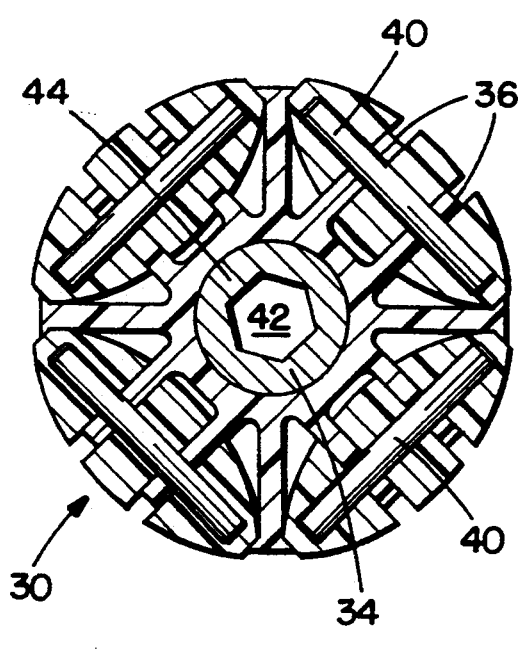
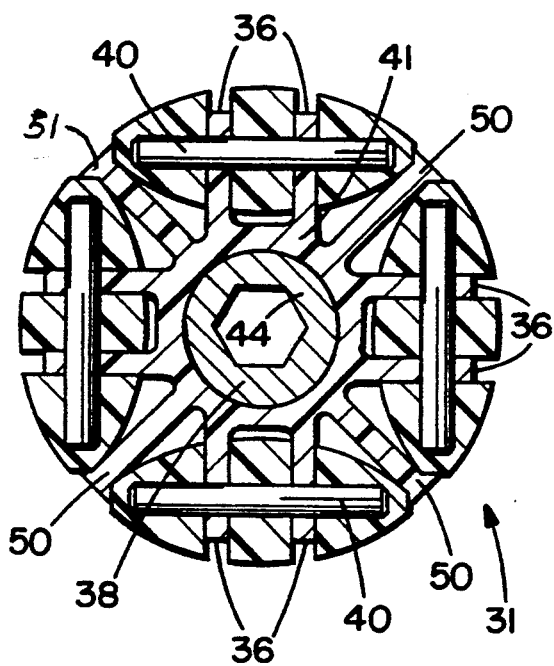

MULTI-DIRECTIONAL ROLLER

BACKGROUND OF THE INVENTION

1. Field of the Invention

The present invention relates to conveying apparatus in which roller type conveyors are employed. More particularly, the invention pertains to a roller design that permits movement of material, packages, or other freight in any desired direction.

Freight conveying apparatus for the movement of containers, packages, and pallets of the type using rollers are employed in various facilities and applications. In such systems, it is regularly desirable to divert the movement of the transported items at an angle to a given path of movement. Sometimes it is desirable to transfer the package at a right angle and other times at an oblique angle to the original line of movement. The point at which the direction of the packages are changed is generally referred to as a transfer station. At such stations, the package is diverted from one direction into another direction by the rollers that form the transfer station or location. Also, in assembly or fabrication operations, it is desirable to be able to move and rotate the products with ease. The present invention pertains to an efficient roller design that permits angular movement and rotation of products or packages in any desired direction.

2. Description of the Prior Art

A typical system of the Prior Art would provide a feed conveyor that moves packages by a set or system of drive rollers which may be powered by a motor. At a point where it is desirable to change direction of the packages, a transfer station is provided that receives the packages from the feed conveyor and transfers them to a second conveyor that may be disposed at a right angle to the feed conveyor. The transfer station has a system of rollers that rotate on their axis to permit movement of the package in one direction contain outer roller elements that permit movement of the package in other directions.

An example of a Prior Art system is described in U.S. Pat. No. 3,710,917 and German Patent No. 2627014. These and other systems of the Prior Art fail to provide individual rollers that are rugged and efficient and will stand up under long continued heavy use of conveying freight in its transfer from one direction to another in a conveyor system.

SUMMARY OF THE INVENTION

The present invention provides a multi-directional roller system in which the individual roller units rotate on a principle axis for conveyance in one direction and contain a series of outer roller elements freely turning around the periphery thereof so that material, packages, freight, etc. may be diverted in other directions. The outer series of roller elements are generally oval shaped to replicate a circular sector and each outer roller element comprises a series of segments held in place on individual stainless steel pins. It is the construction of the individual rollers with their series of peripheral roller elements that provide particular advantages in the present system.

Against the foregoing background it is a primary object of the present invention to provide a roller system in which the individual roller units each have a series of outer peripheral roller elements to efficiently permit movement in any desired direction.

It is a further object of the present invention to provide an arrangment that will provide easy replacement of each roller element.

It is a further object of the present invention to provide a solid and rugged roller design in which the outer peripheral roller element structure is ruggedly constructed for long continuous use.

It is a still further object of the present invention to provide a roller system in which each individual roller unit includes a design structure that maintains the segmented outer peripheral roller elements in place.

Another object of the invention is to provide a conveyor roller assembly that can be readily adapted to various roller conveyor systems.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which:

FIG. 4 is a section of a roller assembly unit taken on the line 4—4 of FIG. 3; and FIG. 5 is a section of a roller assembly unit taken on the line 5—5 of FIG. 3.

DESCRIPTION OF THE PREFERRED EMBODIMENT

Figure 1:
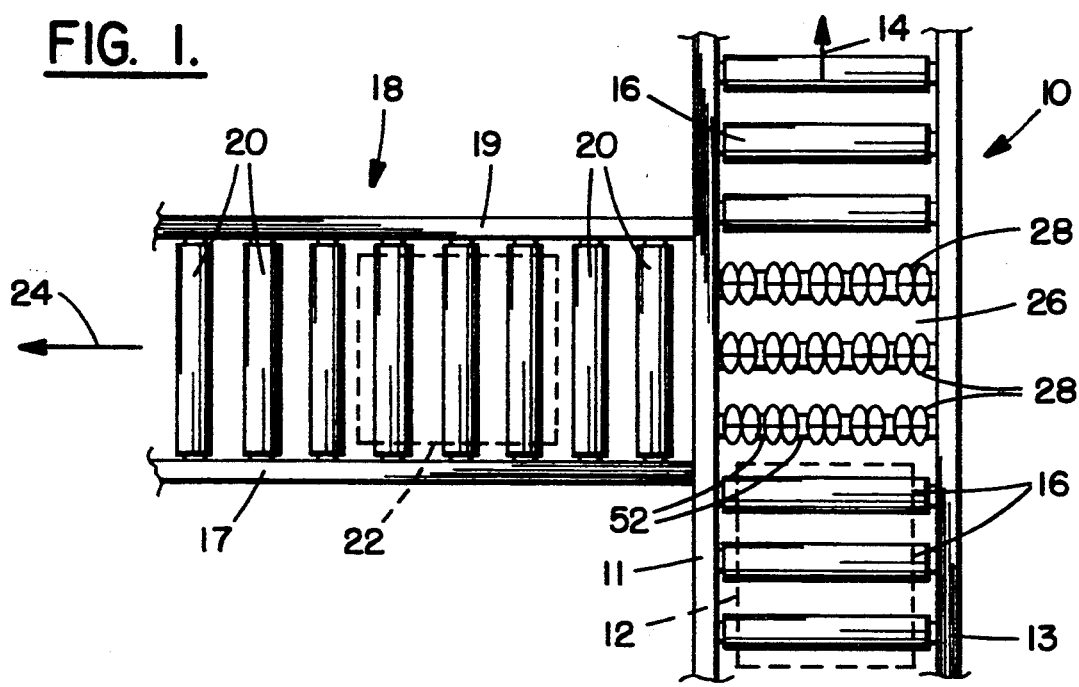
FIG. 1 is a plan view of a conveyor system having a right angle transfer station.

Referring to FIG. 1 of the drawings there is shown a conveyor system that incorporates the roller assembly of the present invention. The system includes a feed conveyor 10 in which packages or freight containers such as 12 are conveyed in the direction of arrow 14. The conveyor 10 includes a pair of parallel sides 11 and 13 that mount a series of cylindrical rollers 16 that may be driven by gravity or a suitable motor mechanism which is well known in the art and not shown in the drawings.

It regularly occurs in a system of conveyance or package sorting that it is desirable to move certain of the packages on to another conveyor system in a different direction. FIG. 1 shows a second conveyor 18 having sides 17 and 19 and a series of cylindrical rollers 20 similar to rollers 16 on the feed conveyor 10. These rollers 20 will convey a package such as 22 in the direction of arrow 24.

Packages are transferred from the feed conveyor 10 to the delivery conveyor 18 at a transfer station 26 which is made up of a series of roller assemblies 28 which are secured to the side members 11. 13 of the conveyor similarly to rollers 16. However, the roller assemblies 28 are formed of a series of multi-directional roller units as distinguished from the cylindrical construction of rollers 16 and 20.

Figure 2:
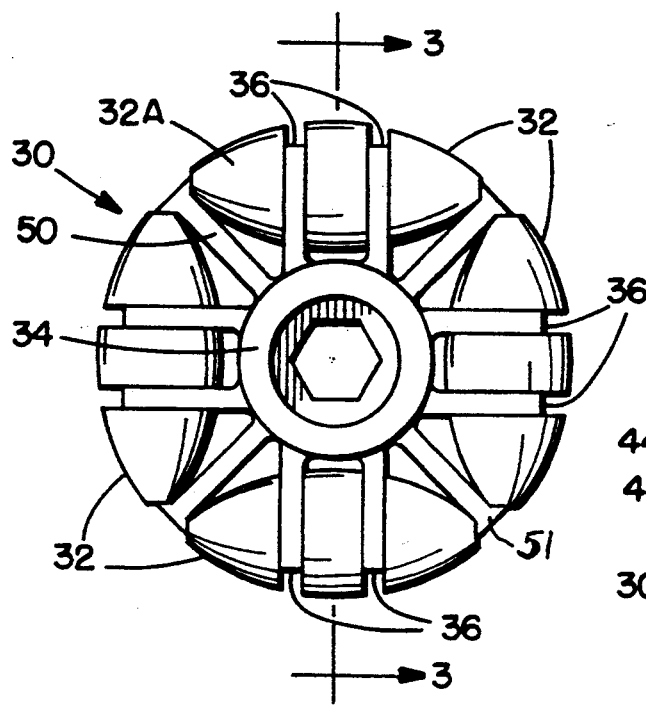
FIG. 2 is a side view of a roller assembly unit having four segmented peripheral rollers.

The multi-directional roller units are shown in the remaining figures and in FIG. 2 the roller unit 30 is seen to comprise four segmented oval shaped roller elements 32 which rotate on pins to be described hereinafter in a direction perpendicular to the rotation of the main roller assembly.

Figure 3:
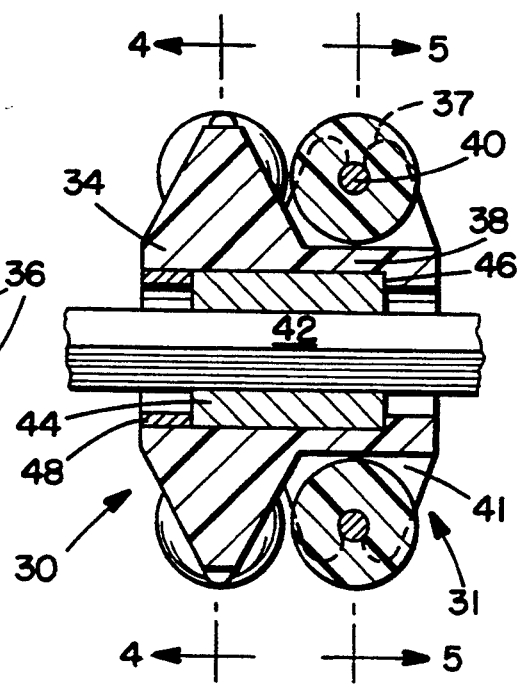
FIG. 3 is a section of two roller assembly units taken on the line 3—3 of FIG. 2.

Roller unit 30 includes a hub 34 from which four pairs of spokes 36 radiate and in which the spokes and hubs may be integrally cast and may for example be formed of a plastic material. The outer ends of each pair of spokes 36 are notched as shown at 37 in FIG. 3 and each pair receive a pin 40 which may be snapped in place in the expanded lower portion of notch 37. The pin 40 supports a segmented oval roller element 32 which comprises three segments each having an axial bore that receives the associated pin 40 allowing the three segments to be retained in position on their respective pins. As seen in FIG. 3 the hub 34 has an axial extention 38, which supports another roller unit 31 that is similar to roller unit 30 except that its hub 41 does not have a hub extension corresponding to 38 of hub 34 but rather is received over extension 38 providing a 45° offset configuration. Roller unit 31 has spokes 36 similar to the spokes 36 of roller unit 30 in that they support pins 40 in notches 37. Each pin 40 again supports an oval roller element 32 made up of three segments.

It is seen that the assembly of FIG. 3 comprises a pair of roller units 30, 31 that fit together as a paired unit which may be received on the roller assembly shaft 42 which may conventionally be a hexagonal shaft. The paired assembly is maintained in place by a bearing 44 that fits tightly on the hexagonal shaft 42 to rotate therewith. Since one end of bearing 44 is received against a shoulder 46 and retained in place by a retaining washer 48, the roller assembly can easily e modified to fit any shaft requirement by replacing the type of bearing 44. This is an important feature of the present invention. In many instances it may be desirable to replace existing rollers with rollers of the present advanced design.

This can be readily done by selecting bearings 44 that are compatible with the shafts of existing rollers to be replaced. Thus it is only neccessary to select bearings having a bore of the shape and size of the existing shaft. The bearings are then inserted in the roller assemblies of the present invention and mounted on the existing shaft whose rollers are replaced.

An important feature of the design is that the roller units 30, 31 that make up a pair are axially offset by 45° to closely replicate a circular outer turning surface as seen more clearly in FIGS. 4 and 5. Hence this design permits movement of a package such as 12 in any lateral direction. Although FIG. 1 discloses the conveyor 18 at a 90° angle with conveyor 10, conveyor 18 may be at any acute angle with conveyor 10 and transfer station 28 would serve to direct the packages off at the acute angle.

A feature of the present invention is that each roller unit 30, and 31 has retaining spokes 50 radiating from their respective hubs 34, 41. Each retaining spoke is equally spaced between adjacent pin spokes 36 and extend radially outward whereby their ends are disposed between adjacent ends of roller elements 32. The end of each retaining spoke 50 is flared outwardly to form a flange 51 that abuts the ends of adjacent roller elements 32. It is understood that the roller elements 32 receive substantially continous hard use and are subject to cracking and sometimes breaking away. Thus, if for example, the segment 32A of roller element 32 were to crack and break the remaining segments of the element on pin 40 would be retained in place by the spokes 50 and 51, preventing a total disintegration of the roller assembly. Of course, eventually the roller pin would be removed and a replaced section 32A would be put into place on the pin and easily snapped back into notch 37.

Thus it is seen that a roller assembly 28 at the transfer station is made up of a series of paired roller unit as 30, 31 which are received for example on a hexagonal shaft 42. The number of roller units would depend upon the width of the conveyor 10 and the corresponding length of shaft 42. The paired rollers may be separated by spacers 52 as seen in FIG. 1 that rotate with the shaft 42.

It is seen then that the present invention contemplates a unique roller design that permits packages to be diverted at any predetermined angle from a feed conveyor at a transfer station. The latter is formed of a plurality of roller assembles made up of paired roller units that conveniently fit together and may be received on one roller assembly shaft. The construction of the roller units of the present invention is such that current cylindrical conveyor roller assemblies in use may be conveniently retrofitted with roller assemblies of the present invention allowing an easy addition of a transfer or sorting station in any work place. This may be done by simply removing current roller assemblies and replacing them with roller units of the present invention on existing conveyor system shafts quickly creating a transfer station.

Having thus described the invention with particular reference to the preferred forms thereof, it will be obvious that various changes and modifications may be made therein without departing from the spirit and scope of the invention as defined in the appended claims.

What is claimed is:

1. In a conveyor system, a roller assembly over which packages are adapted to roll comprising:
   a series of adjacent roller units having a common axis;
   adjacent pairs of roller units of said series forming a unitary pair;
   each of said roller units of a pair having a central hub and four pairs of radiating spokes;
   the hub of one of the roller units of each pair having a hub extension extending axially within the other roller unit of said pair whereby the said pair are adapted to rotate together;
   each pair of radiating spokes being slotted and adapted to receive a roller pin;
   a roller pin positioned in each pair of slotted spokes;
   a roller element comprising three independently rotatable segments being rotatably mounted on each pin;
   said three segments of each roller being separated by its corresponding pair of spokes; and
   a plurality of retaining spokes extending from each roller unit hub the ends of which are disposed between the ends of adjacent roller elements.

2. The roller assembly set forth in claim 1 in which the two roller units of a pair are axially offset whereby the axis of the pins on one roller unit of a pair are disposed at a 45 degree angle with respect to corresponding adjacent pins on the other paired unit.

3. The roller assembly set forth in claim 2 including bearing means located within the said hub and hub extension of the pair of roller units;
   said bearing means having a bore adapted to receive a shaft.

4. In a conveyor system, a roller assembly over which packages are adapted to roll comprising:
   a series of adjacent roller units having a common axis;
   adjacent pairs of roller units of said series forming a pair;

each of said roller units of a pair having a central hub and a plurality of pairs of radiating spokes;

each pair of radiating spokes being slotted at the ends thereof and adapted to receive a roller pin;

a roller pin positioned in each pair of slotted spokes;

a roller element being rotatably mounted on each pin; and a plurality of retaining spokes extending from each roller unit hub the end portions of which are disposed between the ends of adjacent roller elements.

5. The roller assembly set forth in claim 4 in which the number of elements of each roller unit is four pairs of radiating spokes and four roller elements.

6. The roller assembly set forth in claim 5 in which each roller element is of generally oval shape.

7. In a roller assembly for conveying items, a roller unit comprising:

a hub;

a plurality of pairs of parallel spokes extending from said hub;

the end portion of each of said parallel spokes being formed to receive a pin;

pin means located within the ends of each pair of parallel spokes;

a roller element having a central bore positioned on each pin means adapted for rotation;

a plurality of separating spokes secured to said hub, the end portions of which extend between the ends of adjacent rollers; and a replaceable bearing means located within the said hub and having a bore passing therethrough.

8. The roller assembly of claim 7 in which the roller elements are of generally oval shape and segmented into three sections;

said sections being separated by the end portions of the said pairs of parallel spokes.

* * * * *